United States Patent [19]
Woltering

[11] Patent Number: 5,388,469
[45] Date of Patent: Feb. 14, 1995

[54] ROTATING ECCENTRIC WEIGHTS VIBRATOR SYSTEM

[76] Inventor: Howard M. Woltering, Rte. 2, Box 454, Foster, Ky. 41043

[21] Appl. No.: 177,142

[22] Filed: Jan. 4, 1994

[51] Int. Cl.$^6$ ............................................. F16H 33/20
[52] U.S. Cl. ......................................... 74/61; 74/84 R
[58] Field of Search ....................... 74/61, 84 R, 84 S; 366/128; 209/367

[56] References Cited

U.S. PATENT DOCUMENTS

| | | | |
|---|---|---|---|
| 2,350,248 | 5/1944 | Nowlin | 74/84 S |
| 2,371,984 | 3/1945 | Forsyth | 85/61 X |
| 3,404,854 | 10/1968 | DiDella | 244/62 |
| 3,998,107 | 12/1976 | Cuff | 74/84 S |
| 4,075,895 | 2/1978 | Eyman | 74/61 |
| 4,241,615 | 12/1980 | Ryan | 74/61 |
| 4,280,368 | 7/1981 | Woltering | 74/61 |
| 4,579,011 | 4/1986 | Dobos | 74/84 R |
| 5,123,292 | 6/1992 | Woltering | 74/87 |
| 5,129,600 | 7/1992 | Polites | 244/158 R |
| 5,172,599 | 12/1992 | Woltering | 74/61 |

FOREIGN PATENT DOCUMENTS

| | | | |
|---|---|---|---|
| 704568 | 3/1956 | United Kingdom | 74/84 S |
| 213927 | 6/1956 | United Kingdom | 74/61 |
| 2096268 | 10/1982 | United Kingdom | 74/84 R |
| 2097103 | 10/1982 | United Kingdom | 74/84 S |
| 1384345 | 3/1988 | U.S.S.R. | 74/61 |

OTHER PUBLICATIONS

"Vibration and Impact", Ralph Burton, Addison–Wesley Pub. Co. Inc. 1958, pp. 88–94.

*Primary Examiner*—Allan D. Herrmann
*Attorney, Agent, or Firm*—William S. Ramsey

[57] ABSTRACT

The vibrator system of this invention provides conversion of rotary motion to an unidirectional motion and may be used to propel watervessels. The vibrator system involves a rotating vibrator unit which bears large and small rotating eccentric weights. A gear arrangement provides synchronized rotation of the weights which results in a net unidirectional force. In a second embodiment, two vibrator units are mounted on a single frame and are rotated in synchrony.

10 Claims, 5 Drawing Sheets

ROTATING ECCENTRIC WEIGHTS VIBRATOR SYSTEM

BACKGROUND OF THE INVENTION

1. Field of the Invention.

This invention relates to mechanisms in which a vibratory system is used to impart an impulse in one direction. This system may be used wherever such vibration is needed.

2. Description of Related Art.

U.S. Pat. No. 3,998,107 discloses a device for converting rotary motion into unidirectional linear motion. It involves a crank-like axle about which are connected a series of weights which are caused to rotate by a rotating cylindrical supporting structure. This system is described as resembling rocket and jet engines in that the system can achieve propulsion without the involvement of an external reactive medium.

U.S. Pat. No. 3,404,854 discloses an apparatus for imparting a net translational motion to a vehicle on a support system, to a water vessel or to a lighter-than-air vessel. It involves the rotation of an unbalanced weight mounted in turn on a rotating frame.

U.S. Pat. No. 4,241,615 discloses a device for imparting vibrating force to a plow in which a weight on a arm is rotated within a housing. In one embodiment, teeth on the circumference of the housing imparts rotation to the weight.

U.S. Pat. No. 4,280,368 discloses an adjustable device for producing vibratory forces which involves intermeshed gears mounted on plates. The angle between the plates may be adjusted thereby changing the magnitude of the vibratory forces produced.

U.S. Pat. No. 4,579,011 discloses a propulsion apparatus in which a rotating cam activates pistons in fluid filled reservoirs thereby causing an unbalanced centrifugal force and movement of the apparatus in a preselected linear direction.

U.S. Pat. No. 5,123,292 discloses a motivational generator for shakers and vehicles in which unbalanced weights mounted on arms in chevron-shaped vibratory devices are caused to rotate by a frame which itself rotates.

U.S. Pat. No. 5,172,599 discloses a vibratory device for shakers and vehicles in which unbalanced weights on arms are driven by gears mounted on a rectangular platform. The platform rotates is mounted on a rectangular frame which also rotates. The gyroscope-like rotation of the frame damps unwanted vibrations resulting in defined back and forth vibratory motions in a single plane.

SUMMARY OF THE INVENTION

The rotating eccentric weights vibrator system of this invention is comprised of a base and a rotating rectangular frame having mounted upon it eccentric weights which rotate in synchrony. The base has two arms which extend upright, and a rotating rectangular frame is supported by the arms and rotates about an axis located at about the middle of the long axis of the rotating rectangular frame. Rotating gear axles are mounted from one long side of the rectangular frame to the other, and the gear axles are parallel to the short sides of the rotating rectangular frame.

Two large gears are mounted on the gear axles which are closest to the axis about which the rotating rectangular frame rotates. These large gears mesh with small gears mounted on gear axles and cause the small gears to rotate. Eccentric weights are also mounted on the gear axles, large eccentric weights on axles with large gears and small eccentric weights on axles with small gears.

A stationary gear is mounted on the base. Drive gears which drive the rotation of large gears mesh with the stationary gear either directly or via an intermediate gear so rotation of the rotating rectangular frame causes rotation of the large gears in opposite directions, and subsequently rotation of the small gears in opposite directions to those of the large gears.

Eccentric weights are mounted on the gear axles and rotate with the gears. Large eccentric weights are mounted on axles having large gears and small eccentric weights on axles having small gears. The mass of large eccentric weights is twice that of the small eccentric weights.

Rotation of the rotating rectangular frame causes rotation of the gears, gear axles, and eccentric weights associated with the rotating rectangular frame. The rotation of the large eccentric weights generate forces which are in part canceled by the rotation in the opposite direction of the small eccentric weights. The net result is a force expressed in one direction only which may be used to propel a vehicle such as a watercraft.

The system of this invention may be regarded formally as one unbalanced flywheel on a axle which is synchronized to another unbalanced flywheel on a axle (Vibration and Impact R. Burton, Addison-Wesley Pub. Co. Inc., Reading, Mass., 1958, pages 89–92). Periodic forces which result in vibration in such a motor result from the displacement of the center of mass of the flywheel from the axis of rotation, which is located in the center of the rotating axle.

The displacement of the center of mass from the axis of rotation is called the eccentricity and is given the symbol e. When m is the mass of the flywheel, o is the angular velocity, and F is the force generated, for following relation holds:

$$F = meo^2$$

The objective of this invention is to provide a simple means for motivating a vehicle such as a watercraft.

Another objective is to provide means for converting rotatory motion to a unidirectional force.

Another objective is to provide efficient conversion of energy by avoiding lost motion.

Another objective is to provide a motor which is reliable, economical in operation, and may be manufactured at low cost.

DESCRIPTION OF THE PREFERRED EMBODIMENT

Figure 1:
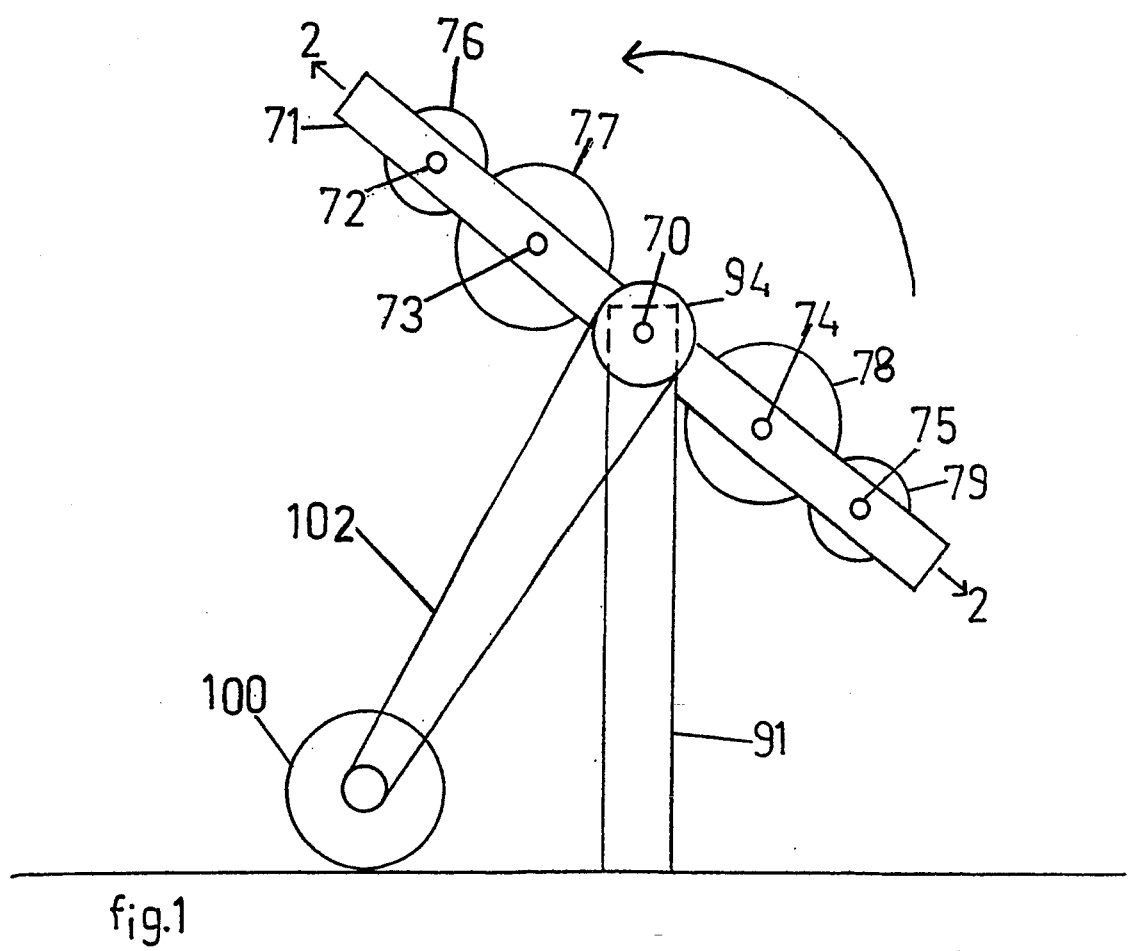
FIG. 1 is a diagrammatic side view of the system including the drive unit.

FIG. 1 is a side view of the rotating eccentric weights vibrator system. The rotating frame 71 is supported by the base 91. An electric motor 100 drives the system via a belt 102. The belt drives a pulley 194 and attached axle 70. Axle 70 causes rotating rectangular frame 71 to rotate. Two large gears 77 and 78 are mounted to the rotating frame by gear axles 73 and 74, respectively. Two small gears 76 and 79 are mounted to the rotating frame by gear axles 72 and 75, respectively. In operation, the rotating frame rotates about axle 70 and associated gears cause rotation of large and small gears and associated eccentric weights. The rotating frame and attached gears, axles, and eccentric weights is called a vibrator unit.

Figure 2:
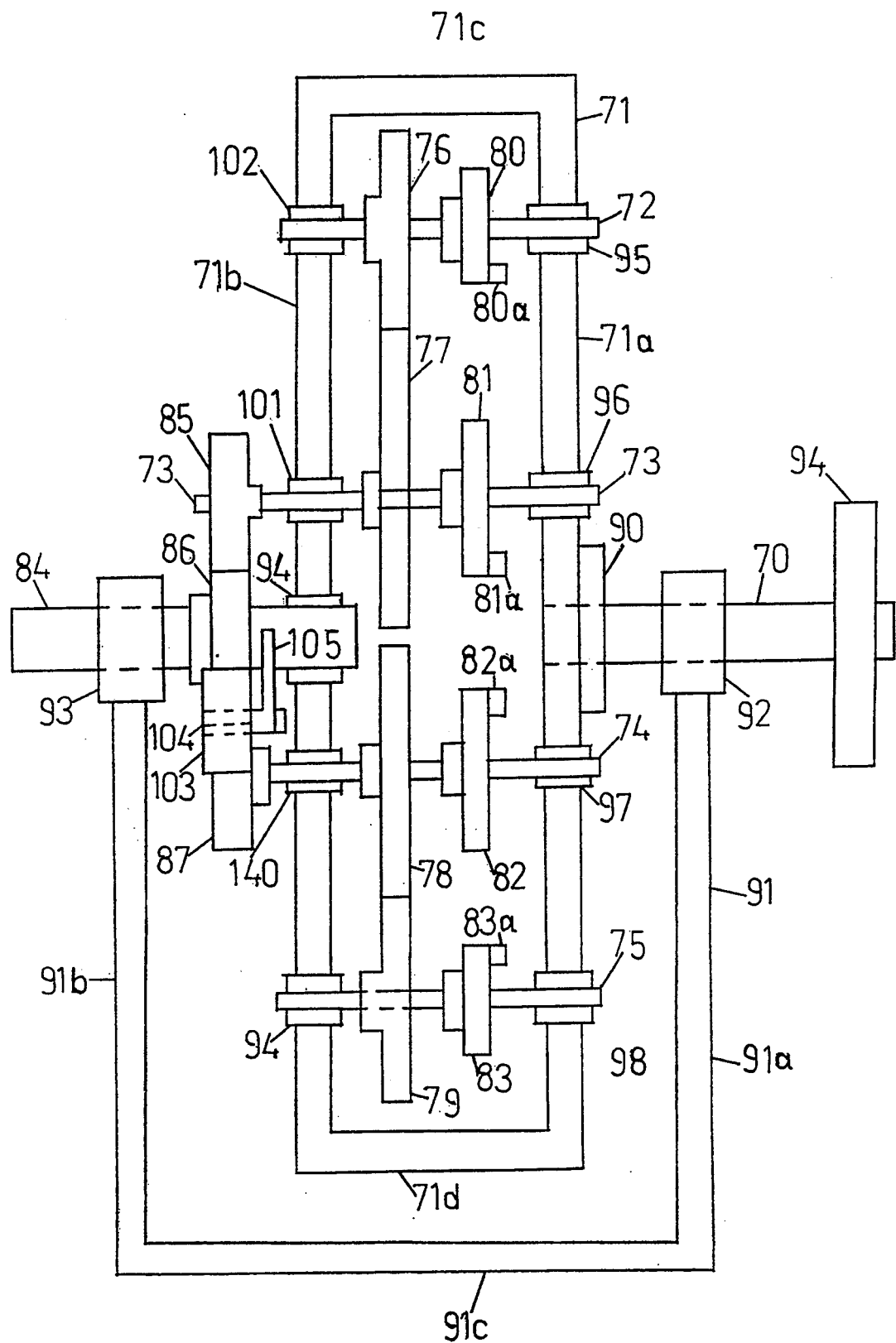
FIG. 2 is a diagrammatic cross section of FIG. 1 along the plane 2—2.

FIG. 2 is a cross section view of the invention. The system is supported by the base frame 91. The base frame is u-shaped and is comprised of two arms, 91a and 91b, and a frame support member 91c. A drive axle 70 or shaft is supported by and rotates in a bearing 92 which is mounted on base frame arm 91a. Immobile axle 84 or shaft is fixedly mounted in a collet 93 which is attached to base frame arm 91b.

The rotating rectangular frame 71 is a rectangular structure comprised of two long members 71a and 71b and two short members 71c and 71d, forming an area enclosed by and inside the rectangular frame.

At approximately the middle of the length of long member 71a a collet 90 is used to fixedly attach one end of drive axle 70 to the frame. A pulley 194 is attached to the other end of drive axle 70. Pulley 194 is attached via a belt or chain to a source of rotative motion such as an electrical motor. Drive axle 70 both partially supports the frame 71 and causes it to rotate.

At approximately the middle of the length of long member 71b the member is pierced by a bearing 94 into which is mounted an immobile axle 84. The frame 71 rotates about and is partially supported by immobile axle 84.

The long members of the rectangular frame are divided into first and second halves by the collet 90 and drive axle 74 and by the bearing 94.

A stationary gear 86 which does not rotate is mounted on the immobile axle 84. Drive gear 85 meshes with stationary gear 86. Drive gear 85 is mounted on gear axle 73 on the outside of the frame 71. Axle 73 extends through bearing 101 mounted in frame member 71b and through bearing 96 mounted in frame member 71a. Gear axle 73 is free to rotate. Large gear 77 is fixedly mounted on gear axle 73. Also fixedly mounted on gear axle 73 is eccentric weight 81. A crescent-shaped weight 81a is mounted on eccentric weight 81. Thus rotation of gear 85 causes rotation of large gear 77 and eccentric weight 81.

Small gear 76 and eccentric weight 80 are fixedly mounted on gear axle 72. Crescent-shaped weight 80a is mounted on eccentric weight 80. Gear axle 72 extends between bearing 102 mounted in frame member 71b and bearing 95 mounted in frame member 71a. Gear axle 72 is free to rotate. Small gear 76 meshes with and is caused to rotate by large gear 77.

Intermediate gear 103 is rotatively mounted on axle 104 which is attached by member 105 to immobile axle 84. Intermediate gear 103 meshes with stationary gear 86 and with drive gear 87. The role of intermediate gear 103 is to cause drive gears 85 and 87 to rotate in opposite directions.

Drive gear 87 meshes with intermediate gear 103. Drive gear 87 is mounted on gear axle 74 on the outside of the frame 71. Gear axle 74 extends through bearing 140 mounted on frame member 71b and bearing 97 mounted on frame member 71a. Gear axle 74 is free to rotate. Large gear 78 is fixedly mounted on gear axle 74. Also fixedly mounted on gear axle 74 is eccentric weight 82. Crescent-shaped weight 82a is mounted on eccentric weight 82. Thus rotation of gear 87 causes rotation of large gear 78 and eccentric weight 82.

Stationary gear 86, drive gears 85 and 87, and intermediate gear 103 have the same diameter.

Small gear 79 and eccentric weight 83 are fixedly mounted on gear axle 75. Crescent-shaped weight 83a is mounted on eccentric weight 83. Gear axle 75 extends between bearing 99 mounted on frame member 71B and bearing 98 mounted on frame member 71A. Gear axle 75 is free to rotate. Small gear 79 meshes with and is caused to rotate by large gear 78.

Other means, such as individual electric motors, may be used to cause rotation in opposite directions of gear axles 73 and 74.

Figure 4:
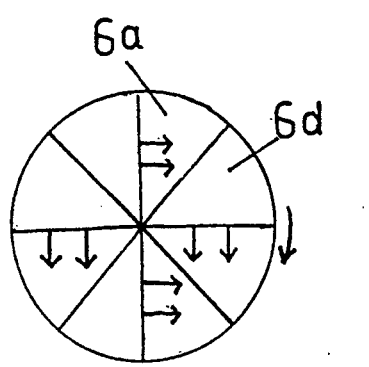
FIGS. 4 and 5 are diagrams depicting the forces generated by the vibrator unit.

The eccentric weights are illustrated in FIG. 4 as disks in side view. They may be constructed as hemicircles or as weights mounted on a disk asymmetrically with respect to the center of the disk.

The diameter and mass of small gear 76 are equal to that of small gear 79. The diameter and mass of large gear 77 are equal to that of large gear 78. The diameter of large gears 77 and 78 is twice that of small gears 76 and 79. The mass of large eccentric weight 81 is equal to that of large eccentric weight 82. The mass of small eccentric weight 80 is equal to that of small eccentric weight 83. The mass of each of the large eccentric weights is twice that of each of the small eccentric weights. The mass of the vibrator unit comprised of rectangular frame, intermediate gear, drive gear, large and small gears, large and small eccentric weights, associated gear axles and gears is substantially symmetrically distributed about the axis of symmetry formed by immobile axle 84 and drive axle 70.

The motor may be constructed of any suitable strong and durable material, such as steel, iron, polymers.

Figure 3:
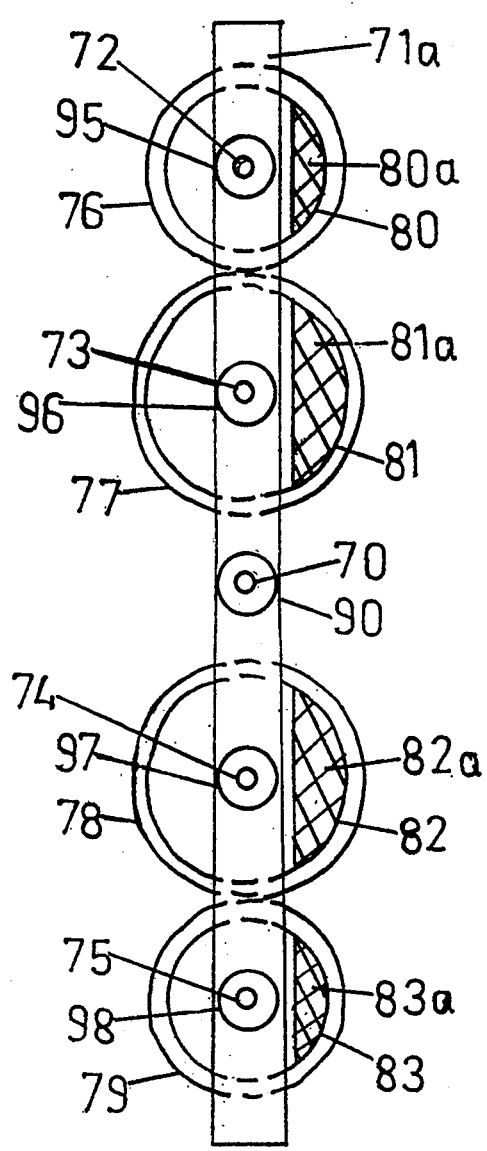
FIG. 3 is a diagrammatic side view of the vibrator unit consisting of a rotating frame with associated gears and eccentric weights.
Figure 7:
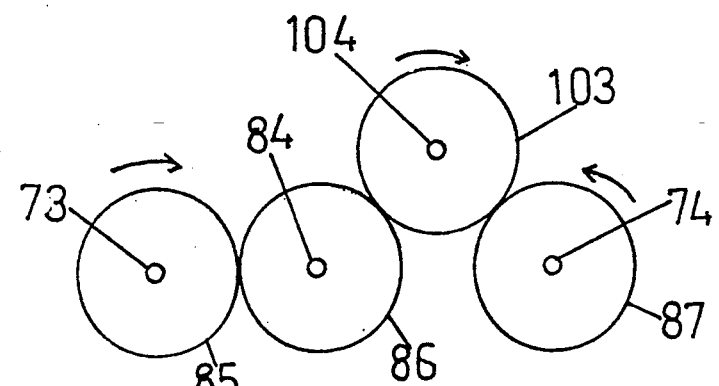
FIG. 7 is a diagram depicting the arrangement of the stationary gear, intermediate gear, and drive gears.

FIG. 3 is a side view of the rotating rectangular frame with associated gears, axles, and weights, also called a vibrator unit, of the motor depicted without the base frame for clarity. In this Fig., a long frame side 71a supports gears 76, 77, 78, and 79 and eccentric weights 80, 81, 82, and 83. The frame rotates about axle 70 fixedly attached by collet 90 to long frame side 71a and located at about the middle of the length of the long frame side 71a. Large gear 77 is attached to gear axle 73. Gear axle 73 is mounted by bearing 96 to long frame side 71a adjacent to axle 70. Small gear 76 is mounted on gear axle 72. Gear axle 72 is mounted by bearing 95 to long frame side 71a adjacent to gear axle 73. Small gear 76 meshes with and is rotated by large gear 77. Large gear 78 is attached to gear axle 74. Gear axle 74 is mounted by bearing 97 to long frame side 71a adjacent to axle 70. Small gear 79 is mounted on gear axle 75. Gear axle 75 is mounted by bearing 98 to long frame side 71a adjacent to gear axle 74. Small gear 76 meshes with and is rotated by large gear 78. Large gears 77 and 78 do not mesh.

Disk-shaped eccentric weights 80a, 81a, 82a, and 83a are attached to gear axles 72, 73, 74, and 75, respectively. Crescent-shaped weights 80A, 81A, 82A, and 83A are attached to eccentric weights 80, 81, 82, and 83, respectively.

The means for rotating the gear, axles are not shown in FIG. 3.

In operation, pulley 194, drive axle 70, and rectangular frame 71 are caused to rotate by an external source of power such as an electrical motor. Rotation of rectangular frame 71 about the axis formed by immobile axle 84 and drive axle 70 causes rotation of drive gear 85 which meshes with stationary gear 86. Rotation of drive gear 85 causes rotation of large gear 77 and large eccentric weight 81. In addition, rotation of large gear 77 causes rotation of small gear 76 and small eccentric weight 80. Rotation of rectangular frame 71 about the axis formed by immobile axle 84 and drive axle 70 causes rotation of intermediate gear 103 which meshes with stationary gear 86. Rotation of intermediate gear 103 causes rotation of drive gear 87. Rotation of drive gear 87 causes rotation of large gear 78 and large eccentric weight 82. In addition, rotation of large gear 78 causes rotation of small gear 79 and small eccentric weight 83.

Figure 5:
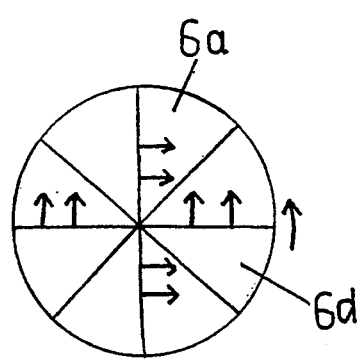

FIGS. 4 and 5 show the cancellation and reinforcement of forces generated by the rotation of eccentric weights. FIG. 4 shows a clockwise rotating eccentric weight on a motor and FIG. 5 shows a counterclockwise rotating eccentric weight on the same motor. In both FIGS. 4 and 5, sector 6d preceeds sector 6a in rotation. Forces generated in sectors 6d of FIG. 5 cancel the forces of 6d of FIG. 4. The forces of 6a of FIG. 4 add to the forces of 6a of FIG. 5.

FIGS. 6a–6d depict the centrifugal forces generated by the rotation of the eccentric weights during one revolution of the rotating rectangular frame.

Figure 6A:
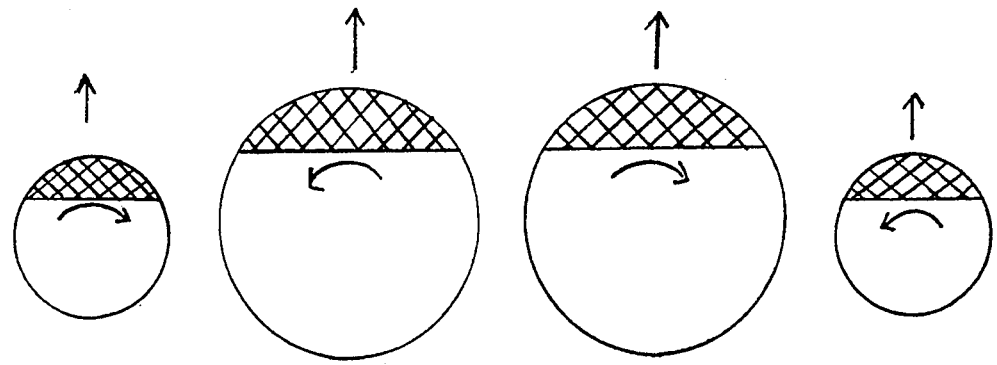
FIGS. 6A, 6B, 6C and 6D are diagrams depicting the relative rotation of the gears and eccentric weights showing the direction of generated forces.

FIG. 6a shows the beginning of a revolution when all eccentric weights are oriented on the same side and there is a net impulse in the direction of the arrows.

Figure 6B:
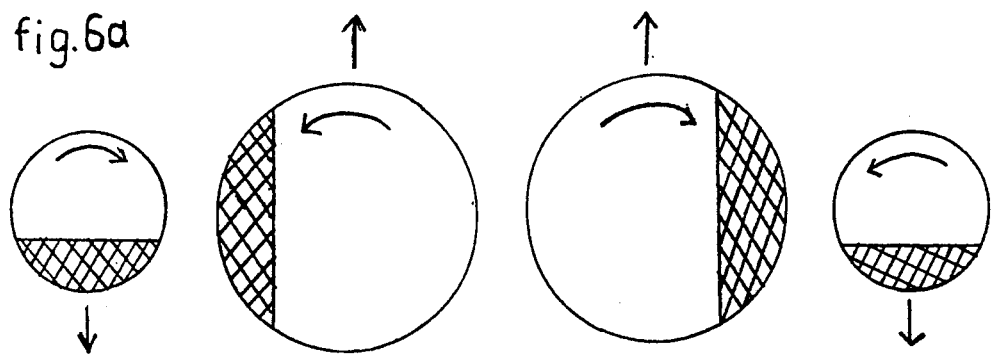

FIG. 6b shows the forces after ¼ revolution where the net impulse is in part canceled by the rotation of the large eccentric weights through a ¼ revolution and by the rotation of the small eccentric weights through a ½ revolution.

Figure 6C:
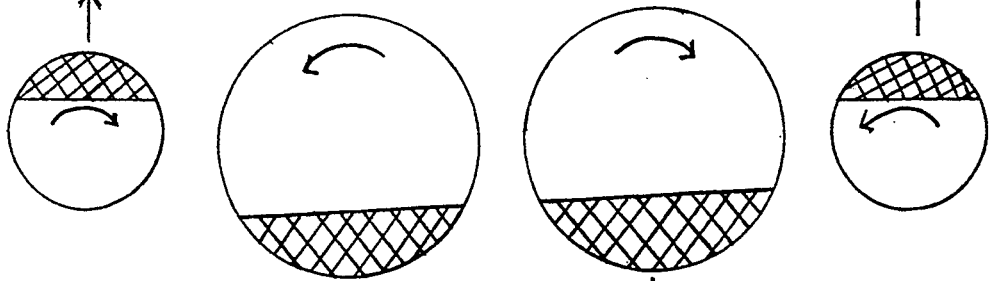

FIG. 6c shows the net forces again in a reduced condition due to a further ¼ revolution of the large gears and due to opposed forces generated by a ½ revolution of the small gears.

Figure 6D:
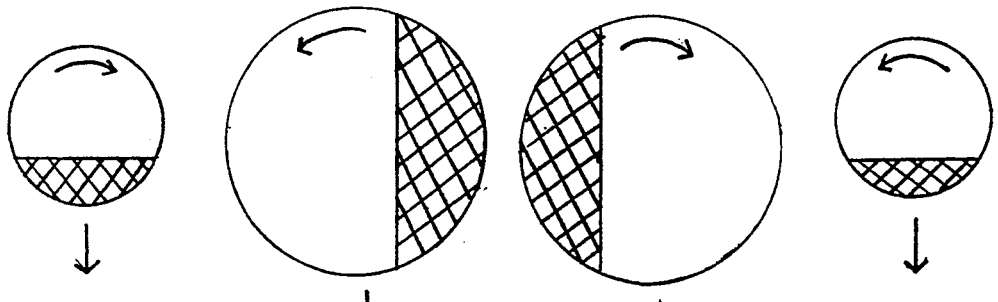

Finally, FIG. 6D shows the last quarter of the revolution where a minor net force in the direction of the arrows is generated by a further ¼ rotation of the large eccentric weights and by the ½ revolution of the small eccentric weights.

Figure 8:
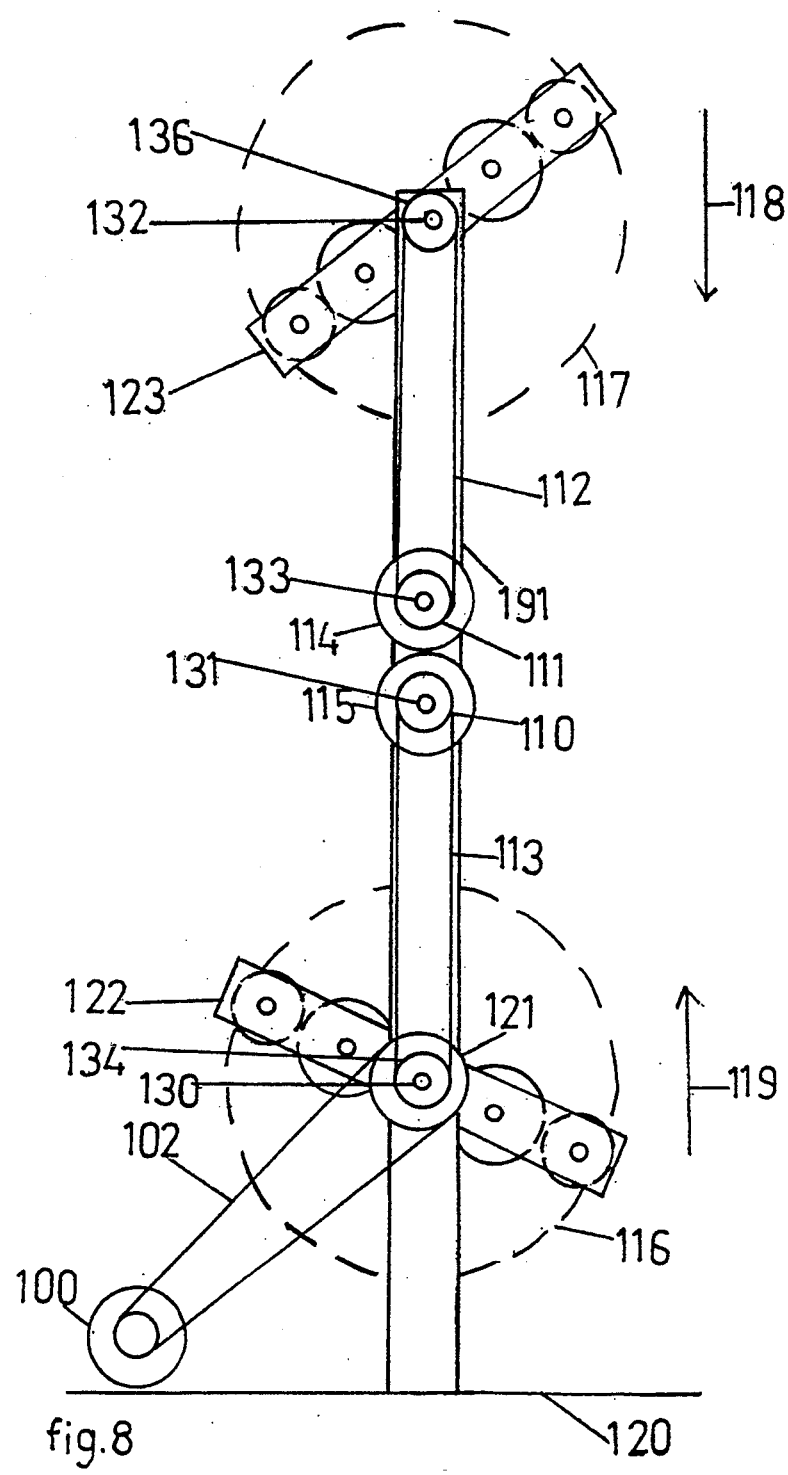
FIG. 8 is a second embodiment of the system in which two vibrator units are mounted on a single base and rotated by a single drive motor.

FIG. 8. is a side view of a second embodiment of the invention. This embodiment is supported by a base 120 upon which is mounted the drive motor 100 and a u-shaped base frame 191 mounted perpendicular to the base. Lower vibrator unit 122 and upper vibrator 123 are rotatively mounted between the arms of base frame 191 by axle 130. A pulley 121 is fixedly attached to axle 130 so that rotation of pulley 121 causes vibratory unit 122 to rotate. Pulley 121 is connected by belt 102 to motor 100. Rotation of pulley 121 causes rotation of vibrator unit and associated gears, axles, and weights in the same manner that rotation of pulley 94 in FIG. 2 causes rotation of the vibrator unit and associated gears, axles, and weights. Dotted line 116 shows the circular movement of vibrator unit 122 and arrow 119 shows the counterclockwise movement of vibrator unit 122.

Pulley 134 is also attached to axle 130 so that rotation of vibratory unit 122 causes rotation of pulley 134.

Vibratory unit 123 is mounted at the upper end of base frame 191 by axle 132. A pulley 136 is fixedly attached to axle 132 so that rotation of pulley 136 causes vibratory unit 123 to rotate. Pulley 136 is connected by belt 112 to pulley 111. Rotation of pulley 136 causes rotation of vibrator unit and associated gears, axles, and weights in the same manner that rotation of pulley 194 in FIG. 2 causes rotation of the vibrator unit and associated gears, axles, and weights. Dotted line 117 shows the circular movement of vibrator unit 123 and arrow 118 shows the clockwise movement of vibrator unit 123.

Axle 131 is mounted near the middle of the length of base frame 191. Intermediate gear 115 and pulley 110 are attached to axle 131. Axle 133 is mounted near the middle of the length of base frame 191. Intermediate gear 114 and pulley 111 are attached to axle 133. Axle 133 is close enough to axle 131 that intermediate gear 115 meshes with intermediate gear 114.

Belt 113 attaches pulley 110 to pulley 134. Belt 112 attaches pulley 111 to pulley 136.

Figure 9:
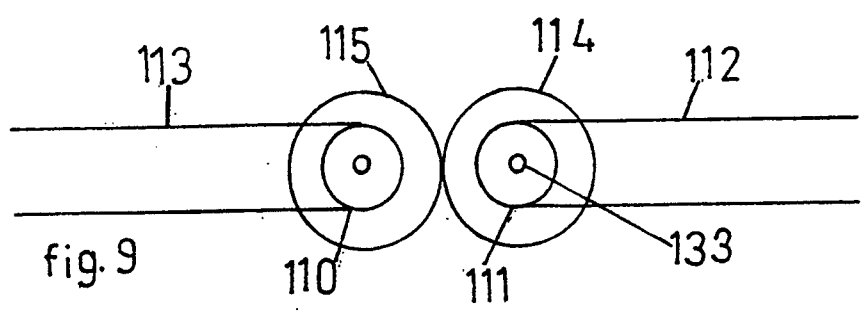
FIG. 9 is a diagram of the drive gears and pullys of the second embodiment system.

FIG. 9 shows the details of the relation between intermediate gears 115 and 114 and pulleys 110 and 111.

In operation, motor 100 causes rotation of pulley 121, axle 130, vibratory unit 122, and pulley 134. Rotation of pulley 134 is conveyed by belt 113 to pulley 110. Rotation of pulley 110 causes rotation of axle 131 and intermediate gear 115. Intermediate gear 115 meshes with intermediate gear 114. Rotation of intermediate gear 115 causes rotation of intermediate gear 114, axle 133, and pulley 111. Rotation of pulley 111 is conveyed by belt 112 to pulley 136. Rotation of pulley 136 causes rotation of vibrator unit 123.

There therefore is an unbalance between the generation of forces depicted in FIGS. 6a–6d, with the strongest forces generated as shown in FIG. 6a. This unbalanced forces results in the generation of mobility in a single direction and may be used to propel a watervessel.

There has been described a novel rotating eccentric weights vibrator system which fulfills all the objects and advantages sought. Many changes, modifications, variations and other uses and applications of the subject invention will, however, become apparent to those skilled in the art. All such changes, modifications, variations and other uses and applications of the present invention which do not depart from the spirit and scope of the invention are deemed to be covered by the invention which is limited only by the claims which follow.

I claim:

1. A vibrator system comprising
a base having two arms,
a vibrator unit rotatively mounted between the two arms of the base,
said vibrator unit comprising
a rectangular frame having two long sides and two short sides, said rectangular frame rotatively mounted between the arms of the base by axles which pierce the long sides at approximately the midpoints of the long sides,
a multiplicity of gear axles rotatively mounted within the rectangular frame, each gear axle extending between the long sides of the rectangular frame, gears of unequal diameter mounted on the gear axles, one gear mounted on each gear axle within the rectangular frame, each gear meshing with an adjacent gear, causing adjacent gear axles to rotate in opposite directions, eccentric weights having unequal masses mounted on the gear axles, one eccentric weight mounted on each gear axle within the rectangular frame, and means for rotating the gear axles; and means for rotating the vibrator unit.

2. The vibrator system of claim 1 wherein the gears of unequal diameter comprise large and small gears, said large gears having a diameter twice that of said small gears.

3. The vibrator system of claim 1 comprising two large gears and two small gears.

4. The vibrator system of claim 1 wherein the eccentric weights having unequal masses comprise large eccentric weights and small eccentric weights, said large eccentric weights having a mass twice that of said small eccentric weights.

5. The vibrator system of claim 1 wherein the means for rotating the gear axles comprises a stationary gear mounted on an immobile axle attached to the base arm, said stationary gear meshing with a drive gear mounted on a gear axle on the outside of the rectangular frame and at a first half of the rectangular frame, and an intermediate gear mounted on the outside of the rectangular frame which meshes with the stationary gear and which also meshes with a drive gear mounted on a gear axle on the outside of the rectangular frame and at a second half of the rectangular frame.

6. The vibrator system of claim 1 wherein the mass of the rectangular frame along with the masses of the gears, axles, and weights mounted thereon is substantially symmetrically distributed about the axles which pierce the long sides of the rectangular frame at approximately the midpoints of the long sides.

7. The vibrator system of claim 1 wherein the means for rotating the vibrator unit comprises a pulley attached to the rectangular frame, an electric motor, and a belt connecting said pulley to said electric motor.

8. The vibrator system of claim 1 wherein the gear axles mounted adjacent to the axles which pierce the long sides at approximately the midpoints of the long sides rotate in opposite directions.

9. A vibrator system comprising:

a base, a base frame having two arms mounted perpendicular on the base, an upper vibrator unit and a lower vibrator unit rotatively mounted between the arms of the base frame, each vibrator unit comprising a rectangular frame having two long sides and two short sides, said rectangular frame rotatively mounted between the arms of the base by axles which pierce the long sides at approximately the midpoints of the long sides, a multiplicity of gear axles rotatively mounted within the rectangular frame, each gear axle extending between the long sides of the rectangular frame, gears of unequal diameter mounted on the gear axles, one gear mounted on each gear axle within the rectangular frame, each gear meshing with an adjacent gear, causing adjacent gear axles to rotate in opposite directions, eccentric weights having unequal masses mounted on the gear axles, one eccentric weight mounted on each gear axle within the rectangular frame, and means for rotating the gear axles; and pulley and belt means interconnecting the upper and lower vibratory units so that rotation of the lower vibrator unit causes rotation of the upper vibrator unit, and means to rotate the lower vibrator unit.

10. The vibrator system of claim 9 wherein the means for rotating the lower vibrator unit comprises a pulley attached to the vibrator unit, an electric motor, and a belt connecting said pulley to said electric motor.

* * * * *